US009010642B2

(12) United States Patent
Willins

(10) Patent No.: US 9,010,642 B2
(45) Date of Patent: Apr. 21, 2015

(54) TRANSPARENT DISPLAY FOR DATA COLLECTION ENGINE

(71) Applicant: Symbol Technologies, Inc., Schaumburg, IL (US)

(72) Inventor: Bruce Willins, East Northport, NY (US)

(73) Assignee: Symbol Technologies, Inc., Holtsville, NY (US)

(*) Notice: Subject to any disclaimer, the term of this patent is extended or adjusted under 35 U.S.C. 154(b) by 178 days.

(21) Appl. No.: 13/904,635

(22) Filed: May 29, 2013

(65) Prior Publication Data

US 2014/0353377 A1 Dec. 4, 2014

(51) Int. Cl.
*G06K 7/10* (2006.01)
*G06K 9/24* (2006.01)
*G06K 7/015* (2006.01)
*G06K 9/32* (2006.01)

(52) U.S. Cl.
CPC ........ *G06K 7/015* (2013.01); *G06K 2207/1011* (2013.01); *G06K 9/32* (2013.01); *G06K 7/10881* (2013.01)

(58) Field of Classification Search
CPC .............. G06K 7/015; G06K 7/10683; G06K 7/10722; G06K 7/10792; G06K 7/10821; G06K 7/10831; G06K 7/10881; G06K 7/1092; G06K 7/1098; G06K 9/32; G06K 2207/1011; G06K 2207/1012; G06K 2007/10485; G06K 2007/10524; G02B 5/3016; G02F 1/13; G02F 1/1306; G02F 1/1313; G02F 1/133308; G02F 1/1347; G02F 1/13471; G02F 1/139
USPC ........ 235/462.2, 462.21, 462.43, 454; 349/16
See application file for complete search history.

(56) References Cited

U.S. PATENT DOCUMENTS

| 5,949,057 A * | 9/1999 | Feng .................... 235/472.01 |
| 2002/0041346 A1* | 4/2002 | Faris et al. ..................... 349/16 |
| 2006/0261167 A1* | 11/2006 | Ray et al. ................. 235/462.08 |
| 2011/0285925 A1* | 11/2011 | Ono et al. ..................... 348/836 |
| 2012/0048940 A1* | 3/2012 | Chaumont et al. ....... 235/462.21 |

* cited by examiner

*Primary Examiner* — Michael G Lee
*Assistant Examiner* — Suezu Ellis

(57) ABSTRACT

An electronic device includes a display device that is at least semi-transparent. The electronic device includes a housing with a first coupling component, a data acquisition device configured to capture first data within a first field of view (FOV), and the display device. The display device includes a viewable portion that is semi-transparent and configured to display second data. The display device includes a second coupling component disposed at least partially on the viewable portion and coupling with the first coupling component to couple the display device to the housing. When the first and second coupling components are coupled, the display device is positioned in such a manner that a second FOV viewed through the viewable portion is viewable by a user. The first FOV of the data acquisition device is within at least a portion of the second FOV of the viewable portion.

16 Claims, 4 Drawing Sheets

TRANSPARENT DISPLAY FOR DATA COLLECTION ENGINE

BACKGROUND OF THE INVENTION

A conventional mobile computing unit is configured to perform a variety of different applications. For example, the mobile unit may utilize an application featuring an augmented reality. Conventional augmented reality relates to a live (direct or indirect) view of a physical, real-world environment whose elements are augmented by computer-generated sensory input such as sound, video, graphics, or GPS data. It is related to a more general concept called mediated reality in which a view of reality is modified by a processor. Augmentation is conventionally performed in real-time and in semantic context with environmental elements (e.g., sports scores on a media broadcast during a game). Through further features (e.g., adding computer vision and object recognition), the information about the surrounding real world of the user becomes interactive and digitally manipulable. In one manner of augmented reality, artificial information about the environment and its objects are overlaid on the real world.

In a specific example of augmented reality, the mobile unit may be used to capture data such as in a barcode. Accordingly, the mobile unit may include a scanning engine. To provide the augmented reality, the mobile unit may further include an imager such that a display device shows a field of view of the imager thereon in real time. A user of the mobile unit or a data capture application utilizes the visual data shown on the display device. However, this provides a sub-optimal experience, particularly to the user. Initially, a user desires a very wide, unobstructed field of view to most easily acquire an item for data capture. Furthermore, the user requires a real-time view with instantaneous responses to movements. These two needs are difficult to achieve using an imager to provide a field of view on the display device. Specifically, the imager can only show the field of view that is capable of being used by the user on the display device; the imager is required to capture the image data which must first be processed prior to showing the image data on the display device; and finally, the image data must be rendered on the display device. During this process, significant power and processing power is required while the imager must remain activated in order to capture the image data as well as video data for the augmented reality view. The processing required for this procedure ultimately leads to a lag or delay in what an imager captures to what is shown to the user. For example, the user may be required to hold the imager in a common position for a pre-determined amount of time to guarantee that what is being shown on the display device corresponds to what is being viewed.

Accordingly, there is a need for a mobile unit including a data capture application that requires less power, less processing power, and a genuine real-time view providing an instantaneous response to movements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
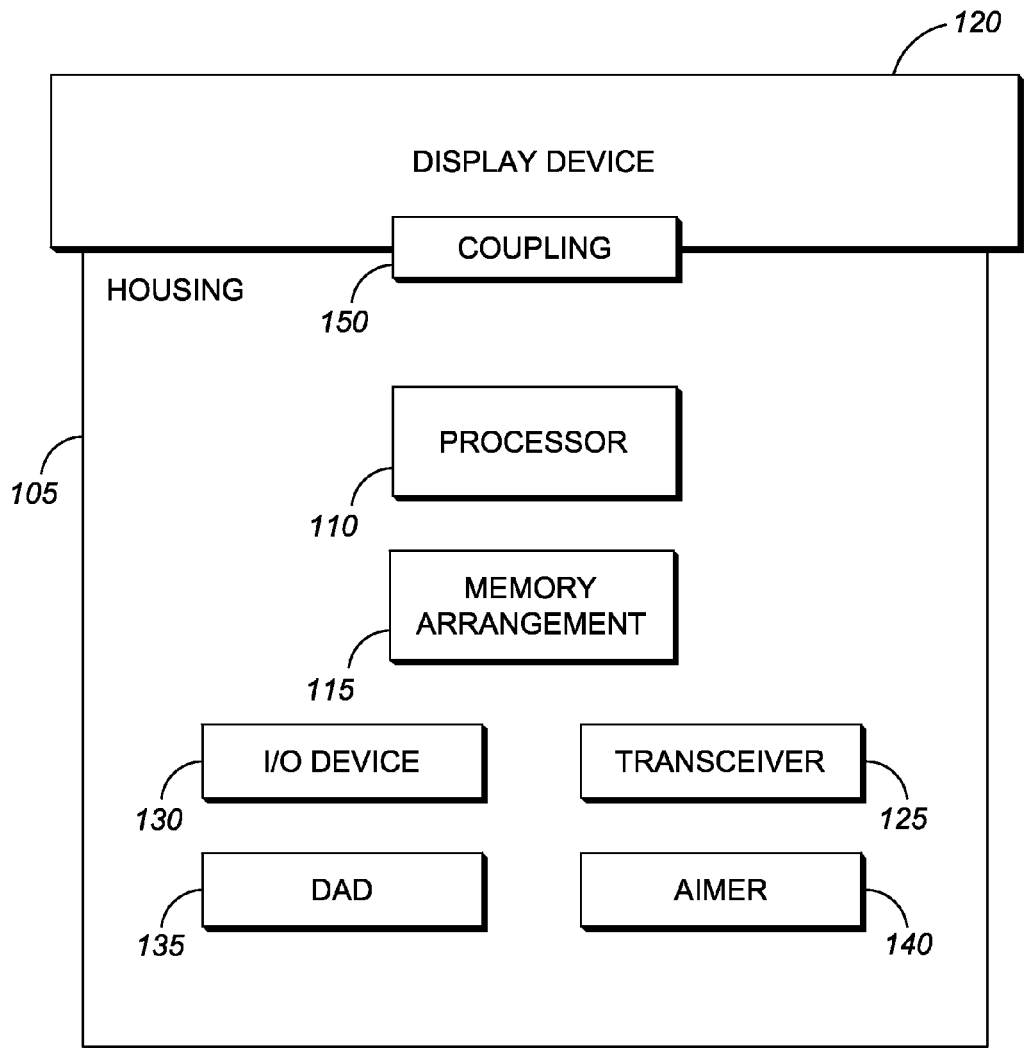
FIG. 1 is a mobile unit including a transparent display device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An electronic device comprises a housing including a first coupling component; a data acquisition device configured to capture first data within a first field of view (FOV); and a display device comprising a viewable portion configured to display second data, the viewable portion being at least semi-transparent and a second coupling component disposed at least partially on the viewable portion and coupling with the first coupling component to couple the display device to the housing, wherein when the first and second coupling components are coupled, the display device is positioned in such a manner that a second FOV viewed through the viewable portion is viewable by a user, wherein the first FOV of the data acquisition device is within at least a portion of the second FOV of the viewable portion.

The exemplary embodiments may be further understood with reference to the following description and the appended drawings, wherein like elements are referred to with the same reference numerals. The exemplary embodiments describe a mobile unit (MU) including a display device that enables a user to view a desired area therethrough. Specifically, the display device may be configured as substantially transparent such that the user is able to view the desired area through the display device itself. The MU may be designed such that there are no components that impede the view of the user through the display device. The MU, the display device, the transparency, and applications thereof will be discussed in further detail below.

Figure 2:
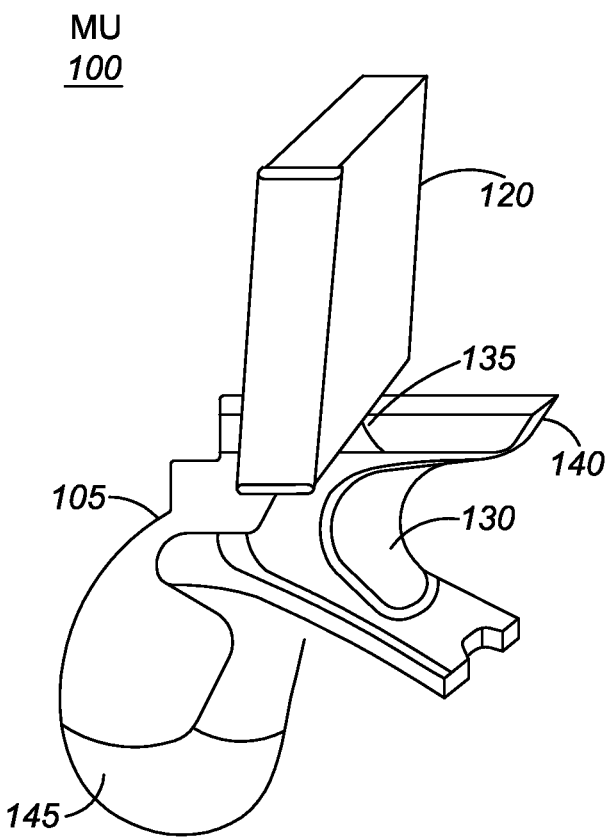
FIG. 2 is a perspective view of the mobile unit of FIG. 1 in accordance with some embodiments.

FIGS. 1 and 2 show a MU 100 in accordance with some embodiments. Specifically, FIG. 1 shows the MU 100 including a transparent display device 120 and other components in accordance with some embodiments. FIG. 2 is a perspective view of the MU 100 of FIG. 1 in accordance with some embodiments. In particular, FIG. 2 shows an exemplary design of the MU 100. The MU 100 may be any portable device such as a mobile phone, a personal digital assistant, a smartphone, a tablet, a laptop, a barcode reader, etc. Accordingly, the MU 100 may be a handheld device in which the user is capable of moving the MU 100. The MU 100 may include a housing 105, a processor 110, a memory arrangement 115, a display device 120 (e.g., a transparent display device), a transceiver 125, an input/output (I/O) device 130, a data acquisition device (DAD) 135, an aimer 140, and a coupling 150. However, it should be noted that the MU 100 may include further components such as a scanning engine, sensors, a portable power supply (e.g., battery), a lighting arrangement, etc.

The housing 105 may be any component configured to at least partially dispose the components therein. According to the exemplary embodiments, the housing 105 may house the processor 110, the memory arrangement 115, the transceiver 125, the I/O device 130, the DAD 135 and the aimer 140. As will be more clear below, the I/O device 130, the DAD 135, and the aimer 140 may be at least partially disposed in the housing 105 such that at least a portion thereof is exposed to an exterior to enable a respective functionality. According to the exemplary embodiments, the housing 105 may also be designed with a pistol grip 145 (shown in FIG. 2). The design of the housing 105 is also configured such that the display device 120 is coupled thereto in a manner that a view through the display device 120 is not impeded by any portion of the housing 105 (or any other component of the MU 100).

The processor 110 may provide conventional functionalities for the MU 100. For example, the MU 100 may include a plurality of applications that are executed on the processor 110 such as an application including a web browser when connected to a communication network via the transceiver 125. In a specific exemplary embodiment, the processor 110 may execute a data capture application such as receiving a barcode and decoding the data therein. The memory 115 may also provide conventional functionalities for the MU 100. For example, the memory 115 may store data related to operations performed by the processor 110. The transceiver 125 may be any conventional component configured to transmit and/or receive data. The transceiver 125 may therefore enable communication with other electronic devices directly or indirectly through a network.

The display device 120 may be any component configured to show data to a user. According to the exemplary embodiments, the display device 120 may be designed in a substantially transparent manner such that a user is capable of viewing beyond the display device 120. Further functionalities of the display device 120 may also be included. For example, the I/O device 130 may be any component configured to receive an input from the user. The display device 120 may incorporate the I/O device 130, particularly when the I/O device 130 is a touch sensing pad including an area in which the user may enter inputs. Specifically, the I/O device 130 may be a transparent touch sensor placed on top of the display device 120 that enables a user to enter inputs on a surface of the display device 120. It should be noted that the I/O device 130 may be any conventional type that is at least partially disposed in the housing 105. For example, the I/O device 130 may be a keypad (e.g., alphanumeric keypad, numeric keypad, etc.) or a touch sensing pad for a user to enter inputs manually with a finger(s) or a stylus. In another example and according to the exemplary embodiments, the I/O device 130 may include a trigger disposed at least partially on the housing 105, specifically the pistol grip 145. The trigger enables the data capture application to perform its functionality as well as other components related to the data capture application.

The DAD 135 may be any component configured to capture data. For example, the DAD 135 may be an imager configured to capture an image in a field of view (FOV) thereof. In another example, the DAD 135 may be an imager configured to capture a plurality of temporally consecutive images in the FOV. In yet another example, the DAD 135 may be a barcode scanner. According to the exemplary embodiments, the DAD 135 may further be configured as a scanning engine such that the data capture application is capable of extracting data of a barcode. It should be noted that the use of the barcode is only exemplary. Those skilled in the art will understand that the exemplary embodiments relate to data capture in any form such as an encoded form. Accordingly, the barcode may represent a 1-dimensional barcode, a 2-dimensional barcode, an encoded string, a radio frequency identification (RFID) tag, etc. Furthermore, the DAD 135 may also be configured as any data capture component. As the barcode used herein relates to any type, the DAD 135 may include or correspond to a respective data capture engine. For example, if the data capture is for a RFID tag, the DAD 135 may be a RFID receiver or include this component to allow for the respective functionality.

According to a first exemplary embodiment, when the DAD 135 is a 1-dimensional barcode, the DAD 135 may be configured to emit a laser typically in a line. The laser may be emitted toward a barcode in which a return signal is received in order to capture the data of the 1-dimensional barcode. According to a second exemplary embodiment, when the DAD 135 is an imager, the DAD 135 may be configured to emit an indicator such as a projected frame or point that indicates a direction that the DAD 135 is pointing. Therefore, the projected frame or point may be a portion of an entire FOV of the display device 120. According to a third exemplary embodiment, when the DAD 135 is an imager, the DAD 135 may capture an image that includes at least one data capture target such that the image is processed to extract data included in the at least data capture target. For example, the DAD 135 may have a FOV that is the same as the FOV of the display device 120.

The aimer 140 may be any component configured to show a user a direction that the DAD 135 is facing. In a specific exemplary embodiment, the aimer 140 may be a laser-based so that, when activated, the user is shown a particular location of the FOV of the DAD 135. Furthermore, the aimer 140 may project a variety of shapes to illustrate the location to the user. For example, the aimer 140 may be a laser pointer in which a point is projected to a location. In another example, the aimer 140 may project a laser frame in which an area is projected to a location such that the area is representative of the FOV of the DAD 135. It should be noted that the aimer 140 may be oriented such that the projected pattern coincides with the FOV of the DAD 135. As discussed above, the I/O device 130 may include a trigger. The trigger may be configured as a two-phase operation. In a first, initial phase, the trigger may be pressed a predetermined amount such that the aimer 140 is activated. In a second, subsequent phase, the trigger may be pressed a remaining amount such that the DAD 135 is activated.

The coupling 150 may be any component or plurality of components that couple the display device 120 to the housing 105. In a first example, the coupling 150 may be a first portion of the display device 120 that couples to a second portion corresponding to the first portion of the housing 105. In a second example, the coupling 150 may be a bezel extending from the housing 105 in which the display device 120 is attached thereto. The coupling 150 may include connectors such that data may be transmitted between the display device 120 and the processor 110. If the coupling 150 only provides an attachment feature, the MU 100 may include a further connector (e.g., wire connector) separate from the coupling 150 that allows for the data to be transmitted therebetween.

According to the exemplary embodiments, the display device 120 may be configured to enable a user to view therethrough such that a location behind the display device 120 may be viewed (relative to the user facing the MU 100). For example, a barcode may be present on an item that the user wishes to data capture. As discussed above, a conventional manner of data capture includes an imager continuously capturing image data, processing the image data, and rendering corresponding images on a conventional display device. The display device 120 according to the exemplary embodiments eliminates the requirement that the DAD 135 is used for this functionality. That is, the display device 120 allows the user to view a location without the DAD 135 capturing image data used to be shown on a display. In this respect, the display device 120 lowers the necessary power consumption for a data capture functionality to be performed. Furthermore, as no image data processing/rendering is required, less overall processing power is required. In addition, as the user is directly viewing a location through the display device 120, a genuine real-time view of the location is provided (e.g., when the user moves the MU 100).

It should be noted that the display device 120 may be designed in a variety of manners to enable the user to view therethrough. In a first example and as discussed above, the display device 120 may be fully transparent. That is, the materials used to manufacture the display device 120 may include no components that impede a view therethrough. When the display device 120 is fully transparent, the display device 120 may also be configured to overlay other data thereon. For example, the other data may relate to an item being captured. To maintain the transparent aspect of the display device 120 in an overall manner, the overlay of data on the display device 120 may be substantially transparent such that the user is capable of viewing beyond the overlay of data as well. In a second example, the display device 120 may be semi-transparent. That is, the display device 120 may be partially opaque. In this manner, the user is able to see data shown on the display device 120 but still view a location behind the display device 120. In a third example, the display device 120 may include properties that adjust the transparency thereof For example, the display device 120 may be manufactured with crystals or other material that may be activated to remove the transparency of the display device 120. Accordingly, the user is able to clearly see data shown on the display device 120. However, when the user wishes to view a location behind the display device 120, the crystals may deactivated to cause the display device 120 to become fully or semi-transparent. For example, the crystals may be activated/deactivated as a function of an angle at which the MU 100 is disposed such as an upward angle causing the display device 120 to be transparent, while a downward angle causes the display device 120 to become opaque. It should be noted that the crystals may be used in a dynamic manner. That is, select portions of the display device 120 may be opaque while other portions are transparent. The fully and semi-transparent display device 120 may also include select portions which may remain permanently opaque. It should also be noted that the display device 120 may be configured to compensate for various lighting effects. For example, when the user is in an area with a very high illumination that creates a glare or otherwise difficult to view data on the display device 120, the materials of the display device 120 may be manually selected or automatically altered to compensate for the illumination conditions. In another example, the display device 120 may increase or provide a backlight such that data may be viewed particularly in a low illumination environment.

It should be noted that the MU 100 may include additional components related to adjusting a view of the display device 120, particularly when the display device 120 is fully or semi-transparent. In a first example, an opaque cover may be manually placed behind the display device 120 to enable the user to clearly view the data shown on the display device 120. In a second example, a retractable cover may be included that may be extended to cover an area behind the display device 120.

It should also be noted that the display device 120 may include a border or perimeter that is included in a variety of manners. In a first example, the border of the display device 120 may be of an opaque material. Thus, the display device 120 may include a defined border. In a second example, the border of the display device 120 may also be transparent. The view through the display device 120 encompasses a portion of an overall view seen by the user. In addition, visual discontinuities are eliminated from the edges. In a third example, the display device 120 may be coupled to the housing 105 using a transparent bezel such as the coupling 150. In this manner, even the coupling edge of the display device 120 eliminates any visual discontinuity that would otherwise be present.

Figure 3:
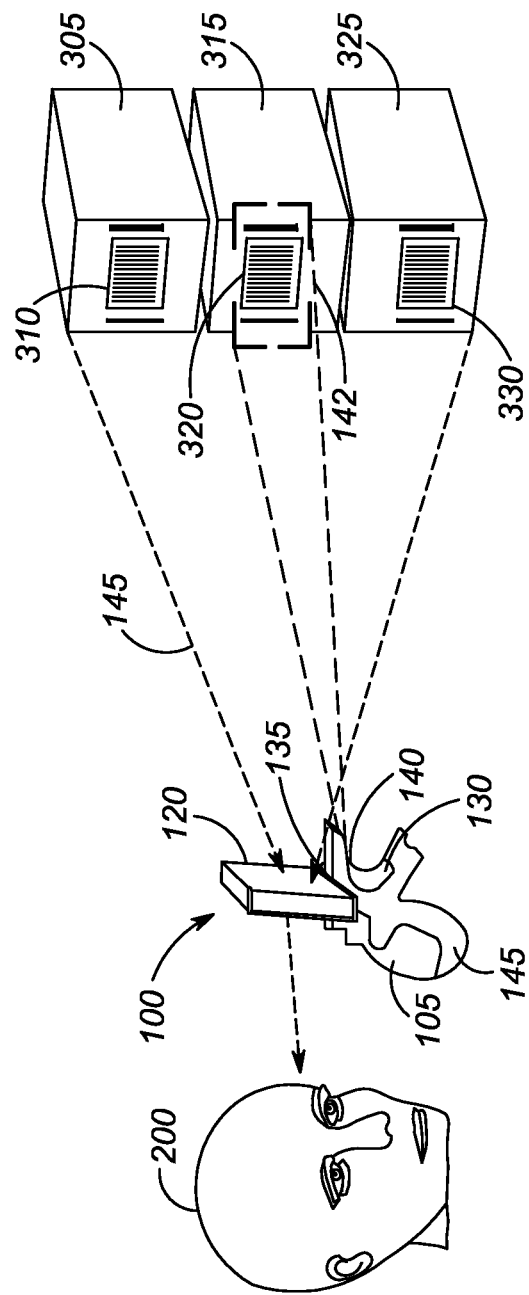
FIG. 3 is an exemplary use of the mobile unit of FIG. 1 in accordance with some embodiments.

FIG. 3 is an exemplary use of the MU 100 of FIG. 1 in accordance with some embodiments. FIG. 3 shows a position of the MU 100, a user 200, and a plurality of items 305, 315, 325. The items 305, 315, 325 may include a barcode 310, 320, 330, respectively. FIG. 3 also shows a projected frame 142 from the aimer 140. The user 200 may hold the pistol grip 145. As illustrated, the user 200 is positioned on a first side of the MU 100. The items 305, 315, 325 may be positioned on a second side of the MU 100 opposite the first side such that the items 305, 315, 325 are viewable through the display device 120. The user 200 may activate the trigger of the I/O device 130 such that the aimer 140 is activated to project the frame 142 on the barcode 320. The user 200 also sees the projected frame 142 through the display device 120. Upon fully pressing the trigger, the DAD 135 may be activated such that a data capture functionality is performed. Specifically, the DAD 135 captures an image or reads the barcode 320. As multiple barcodes are present, the DAD 135 may be configured to capture an image of the entire FOV including the plurality of barcodes or the user 200 may manually move the MU 100 to each barcode.

Figure 4:
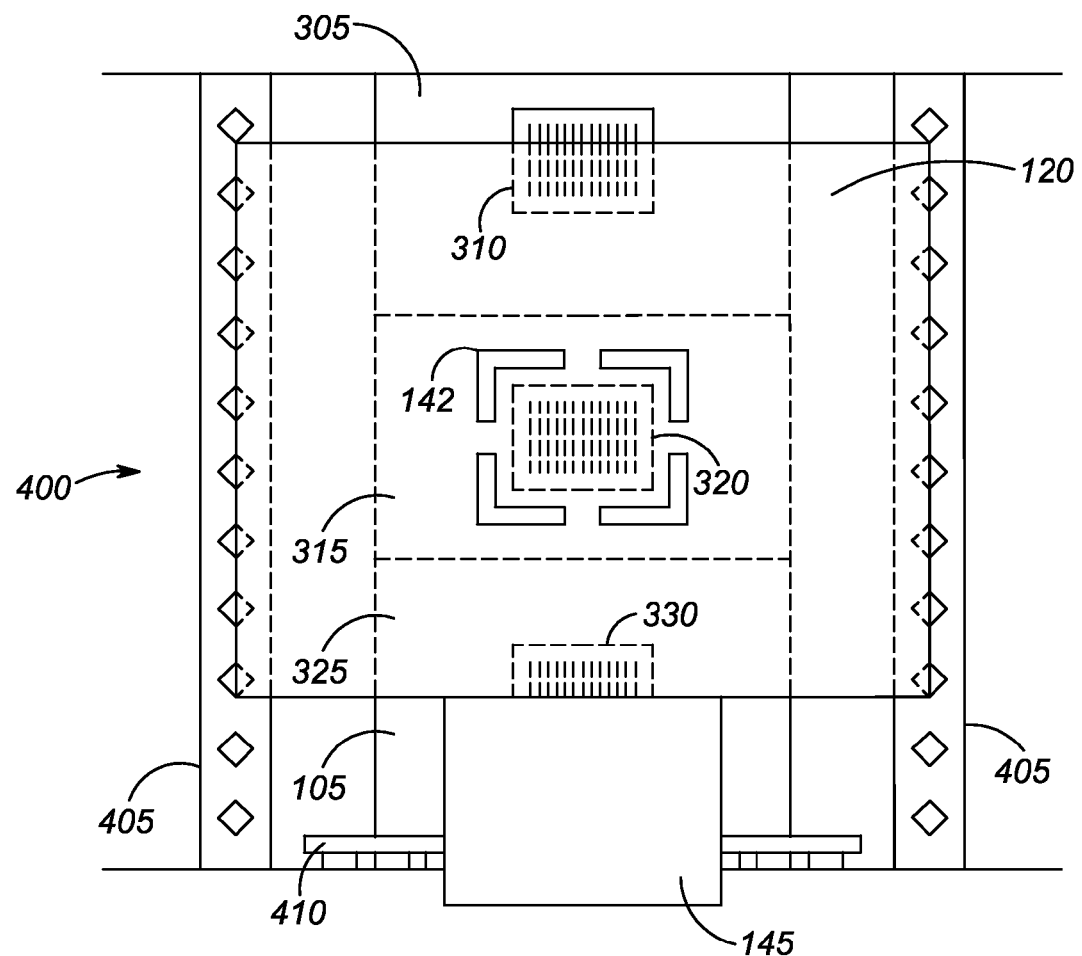
FIG. 4 is a view from a user's perspective for the exemplary use of FIG. 3 in accordance with some embodiments.

FIG. 4 shows a view from a user's perspective for the exemplary use of FIG. 3 in accordance with some embodiments. For illustrative purposes, FIG. 4 further shows a shelf 400 including supports 405 and a pallet 410 on which the items 305, 315, 325 are placed thereupon. The view from the user's perspective shows that a location behind the display device 120 is viewable by the user 200. The projected frame 142 is also viewable. Accordingly, an entire range of the user may be shown in FIG. 4 with a selected portion thereof shown on the display device 120. Should the user 200 move the MU 100, the view on the display device 120 also adjusts in real time as no processing is necessary. It should noted that the display device 120 including a defined border is only exemplary. As discussed above, the display device 120 may include a transparent border such that no visual discontinuities exist for the user 200 when viewing the entire range of the user 200 and the selected portion on the display device 120.

According to a particular exemplary use of the MU 100, the user 200 ideally holds the MU 100 via the pistol grip 145 such that the user 200 is viewing upward through the display device 200 in a direction of an item to be data captured. The user 200 may press the trigger to a first position (e.g., halfway) to activate the aimer 140. The aimer 140 may generate the projected frame 142. Through the display device 120, the user 200 instantly observes the projected frame 142 projected onto the target item. The user 200 may move the aiming pattern 142 such that the item or barcode to be data captured is reached (such as the position shown in FIGS. 3 and 4). Again, the user 200 instantly observes the changes to the projected frame 142 moving during this process. The user then presses the trigger to a second position (e.g., fully) to activate the DAD 135. The DAD 135 may be activated to capture an image of the item for post processing or captures and decodes the barcode 320. The data related to the item may then be superimposed onto the display device 120 at a predetermined location (e.g., as a function of the location of the item in the display device 120). As discussed above, the display device 120 is also configured to show data to the user beyond being viewable therethrough. It should be noted that further data may be used in rendering the superimposed image such as location (e.g., generated via 6-dimensional motion sensors or GPS) and orientation data (e.g., generated via sensors such as an accelerometer). When there is a stack of items 305, 315, 325, the user 200 is able to rapidly move the DAD 135 to data capture each of the items with no delay in the visual on the display device 120 and with minimal processor or power consumed.

The exemplary embodiments provide a MU including a transparent display device. The display device enables a user to view therethrough to a location. The user may then perform a data capture functionality as a function of the view through the display device. For example, an aimer may be activated that generates a projected frame. The user may move the MU until the projected frame reaches a desired location. The user may subsequently activate an imager to perform the data capture functionality. During this process, the view through the transparent display device allows for the user to continually see the desired location with no latency on the view of the transparent display device, thereby providing a genuine real-time view. Furthermore, no processing or rendering of images is performed that would otherwise use power or cause greater delay in the view from requiring processing power.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An electronic device, comprising:
   a housing including a first coupling component;
   a data acquisition device configured to capture first data within a first field of view (FOV); and
   a display device, comprising:
      a viewable portion configured to display second data, the viewable portion being at least semi-transparent and including a plurality of crystals configured to change the viewable portion opaque when the electronic device is angled downward; and a second coupling component disposed at least partially on the viewable portion and coupling with the first coupling component to couple the display device to the housing, wherein when the first and second coupling components are coupled, the display device is positioned in such a manner that a second FOV viewed through the viewable portion is viewable by a user, wherein the first FOV of the data acquisition device is within at least a portion of the second FOV of the viewable portion.

2. The electronic device of claim 1, wherein the viewable portion is fully transparent.

3. The electronic device of claim 1, wherein the viewable portion is configured to overlay the second data thereon.

4. The electronic device of claim 1, further comprising:
an opaque cover one of manually coupled to the viewable portion and movably retracted behind the viewable portion such that the data displayed on the viewable portion is more clearly visible.

5. The electronic device of claim 1, wherein the viewable portion includes a transparent border to eliminate a visual discontinuity.

6. The electronic device of claim 1, wherein the viewable portion is configured for a frame projected from an aimer of the electronic device to be seen therethrough.

7. The electronic device of claim 6, wherein the frame corresponds to the first FOV.

8. The electronic device of claim 1, wherein the viewable portion is configured for a real-time display of a location such that a movement of the electronic device to a further location concurrently corresponds to the real-time display to be the further location.

9. A display device, comprising:
a viewable portion configured to display data, the viewable portion being at least semi-transparent and including a plurality of crystals configured to change the viewable portion opaque when the electronic device is angled downward; and a coupling disposed at least partially on the viewable portion and coupling with a further coupling of a housing of an electronic device, wherein when the coupling and the further coupling are coupled, the display device is positioned relative to the housing in such a manner that a first field of view (FOV) viewed through the viewable portion is viewable by a user, wherein the first FOV of the viewable portion is dimensioned such that a second FOV of a data acquisition device of the electronic device is within the first FOV.

10. The display device of claim 9, wherein the viewable portion is fully transparent.

11. The display device of claim 9, wherein the viewable portion is configured to overlay further data to be displayed on the viewable portion thereon.

12. The display device of claim 9, further comprising:
an opaque cover one of manually coupled to the viewable portion and movably retracted behind the viewable portion such that the data displayed on the viewable portion is more clearly visible.

13. The display device of claim 9, wherein the viewable portion includes a transparent border to eliminate a visual discontinuity.

14. The display device of claim 9, wherein the viewable portion is configured for a frame projected from an aimer of the electronic device to be seen therethrough.

15. The display device of claim 14, wherein the frame corresponds to the second FOV.

16. An electronic device, comprising:
a housing;
a data acquisition device configured to capture first data within a first field of view (FOV);
a display device comprising a viewable portion configured to display second data, the viewable portion being at least semi-transparent and including a plurality of crystals configured to change the viewable portion opaque when the electronic device is angled downward; and
a bezel extending from the housing configured to attach the display device thereon,
wherein the bezel positions the display device in such a manner that a second FOV viewed through the viewable portion is viewable by a user,
wherein the first FOV of the data acquisition device is within at least a portion of the second FOV of the viewable portion, and
wherein the bezel is at least semi-transparent.

* * * * *